(12) United States Patent
Plachinsky et al.

(10) Patent No.: US 10,088,028 B2
(45) Date of Patent: Oct. 2, 2018

(54) SYSTEM STRUCTURE AND METHOD FOR POWERING RACING CAR

(71) Applicant: GRIIIP AUTOMOTIVE ENGINEERING LTD, Petach Tikva (IL)

(72) Inventors: Tamir Plachinsky, Tel Mond (IL); Gil Zakay, Hod HaSharon (IL)

(73) Assignee: GRIIIP AUTOMOTIVE ENGINEERING LTD., Petach Tikva (IL)

(*) Notice: Subject to any disclaimer, the term of this patent is extended or adjusted under 35 U.S.C. 154(b) by 0 days.

(21) Appl. No.: 15/158,324

(22) Filed: May 18, 2016

(65) Prior Publication Data
US 2017/0335940 A1    Nov. 23, 2017

(51) Int. Cl.
*F16H 48/08* (2006.01)
*B60K 17/16* (2006.01)

(52) U.S. Cl.
CPC ............ *F16H 48/08* (2013.01); *B60K 17/165* (2013.01); *F16H 2048/087* (2013.01)

(58) Field of Classification Search
None
See application file for complete search history.

(56) References Cited

U.S. PATENT DOCUMENTS

| | | | |
|---|---|---|---|
| 1,657,510 A | 3/1926 | Leipert | |
| 3,323,608 A * | 6/1967 | Eggert, Jr. | B60F 3/0038 180/54.1 |
| 3,344,687 A | 10/1967 | Stockton | |
| 4,864,890 A * | 9/1989 | Friedrich | B60K 17/16 475/230 |
| 5,107,951 A * | 4/1992 | Kawamura | B60K 17/24 180/233 |
| 6,070,689 A | 6/2000 | Tanaka et al. | |
| 6,491,126 B1 * | 12/2002 | Robison | B60K 17/3462 180/233 |
| 2002/0187874 A1 * | 12/2002 | Kazaoka | B60K 17/351 475/230 |

(Continued)

FOREIGN PATENT DOCUMENTS

| | | | |
|---|---|---|---|
| DE | 4003331 | 8/1991 | |
| WO | WO-9906742 A1 * | 2/1999 | ............ F16C 19/56 |

OTHER PUBLICATIONS

International Search Report of Application No. PCT/IL2017/050531 dated Aug. 24, 2017.

*Primary Examiner* — Justin Holmes
(74) *Attorney, Agent, or Firm* — Pearl Cohen Zedek Latzer Baratz LLP

(57) ABSTRACT

A differential gearbox is for receiving rotational power from a power unit (a motor and a gear) of a 1000 cc motorcycle via a drive shaft, where both the power unit and the differential gearbox are disposed centrally with respect to a transverse dimension of a Formula 1000 category race car chassis. The differential gearbox comprising a stationary differential gearbox case, an input shaft and a pinion sprocket, a power receiving sprocket that is rotatable by the input shaft and the pinion sprocket, a gearbox differential transmission assembly that is mechanically powered by and rotatable with the power receiving sprocket about a common axis, and two output drive shafts rotatable by the differential transmission assembly in different rotation speeds.

6 Claims, 8 Drawing Sheets

(56) References Cited

U.S. PATENT DOCUMENTS

| | | | |
|---|---|---|---|
| 2005/0054471 A1* | 3/2005 | Fleytman | B60K 17/16 475/226 |
| 2005/0173180 A1* | 8/2005 | Hypes | B60K 17/16 180/292 |
| 2006/0289217 A1* | 12/2006 | Schlaf | B60K 23/08 180/247 |
| 2008/0258417 A1* | 10/2008 | Cordier | B60G 3/20 280/124.109 |
| 2012/0234120 A1* | 9/2012 | Fukuda | B60K 17/344 74/405 |

\* cited by examiner

SYSTEM STRUCTURE AND METHOD FOR POWERING RACING CAR

BACKGROUND OF THE INVENTION

Design and manufacturing of racing cars pose high levels of requirements, constrains and limitations that typically contradict each other. For example, the cars chassis must be rigid to stand high energy impacts and yet be light weight so as to impose as low as possible burden to the cars motor. The cars chassis need to be light weight also for reasons of dynamic stability. In addition, the cars center of gravity needs to be as low as possible and as centered as possible for dynamic stability considerations, yet the heaviest elements—the engine and the driver—may not be located very low for obvious reasons.

One very limiting constraint applied with respect to racing cars of the class Formula 1000 is the need to use motors of 1000 cc manufactured for motorcycles. A definition of the binding design constrains regarding racing cars of the Formula 1000 category may be found, for example, in the General Competition Rules (GCR) document that is issued by the Sports Car Club of America Inc. (SCCA) (see in: http://cdn.growasseets.net/user_files/scca/downloads/000/013/696/GCR-_Updated_April_2016.pdf?1459462401). In the 2016 edition, the following definition is found: "Engines: A. Motorcycle-based 4-cycle up to 1000 cc" (GCR of 2016 edition, pp. 368). Further binding rules define the very limited number of changes that may be applied to such engines.

This means that the power block, i.e., the motor itself and its gearbox, which, in the case of a motorcycle, are made as a unified unit, need to be embedded in a racing car chassis and provide torque to the cars wheels while the motorcycle's power block is typically designed to provide torque via a chain and sprockets and, therefore, has its sprocket's axis protruding out of the power block sideways with respect to the longitudinal axis of the motorcycle that is aligned with the travel direction. This poses great trouble to the designers and manufacturers of a Formula 1000 racing cars, since the natural entry point to a differential gearbox (DGB) used for powering the wheels is designed to connect to a shaft aligned with the longitudinal center line of the car, not as the case is with a power block of a motorcycle.

The typical solution for this problem is powering the DGB from the side, and not from the front of the gearbox, using a pair of sprockets and a chain. This power transmission line imposes several disadvantages such as weighty transmission, the need to mechanically maintain the chain frequently, an early beginning of loss of power due to chain/sprocket wear, limitation on the power/speed ratio of the sprocket-to-sprocket transmission when high transmission ratio is required due to a use of a too little section of the smaller sprocket, etc. However, turning the power block 90 degrees about a vertical axis was never an option, as it would have caused several design difficulties. One main difficulty stems from the fact that, when the motor cycle's power block is turned 90 degrees about a vertical axis to turn its power output axis facing backwards, this axis is located too far to the side from the longitudinal line passing through the entry point to the DGB, which causes the drive shaft connecting the output of the power block to the input of DGB to be positioned in a too large angle relative to the line aligned with the axes of these output and input points. While certain bearing assemblies may support such large angles for a power transmission shaft, the price of power loses (excessive friction and heat loses) is too high to be acceptable in a racing car.

The traditional positioning of the motorcycle's power block, as described above, imposes additional disadvantages. One is the need to locate the power block far enough behind the driver's seat in order to leave enough place for the exhaust pipes leaving the motor's head in the forward direction and need to be turned sideways or backwards. The resulting location of the power block to the back of the car is for itself a disadvantage regarding the car's dynamic stability and road behavior.

SUMMARY OF THE INVENTION

A differential gearbox is disclosed adapted, according to embodiments of the present invention, to engage a power unit (a motor and a gear) of a 1000 cc motorcycle via a drive shaft while being disposed centrally with respect to a transverse dimension of a Formula 1000 category race car chassis. The differential gearbox comprises a stationary differential gearbox case (595), an input shaft (560) having a pinion sprocket (560A) disposed at its end and located inside the differential gearbox, a power receiving sprocket (570) rotatable by the input shaft and by the pinion sprocket about an axis that is substantially perpendicular to the axis of the input shaft (570C), a gearbox differential transmission assembly (565) that is mechanically powered by and rotatable with the power receiving sprocket about a common axis, and two output drive shafts (590, 592) rotatable by the differential transmission assembly, where the output drive shafts are rotatable in different rotation speeds. The gearbox case is stationary with respect to the input shaft when rotational input power is provided to the differential gearbox and the pinion sprocket (560A) engages the power receiving sprocket (570) at its side facing away from the gearbox differential transmission assembly.

According to some embodiments, the teeth of the crown sprocket are engraved on the face of the power receiving sprocket facing away from the gearbox differential transmission assembly.

According to additional embodiments, the gearbox differential transmission assembly further comprises at least two arms (570A, 570B) perpendicularly connected to the face of power receiving sprocket facing away from its engraved teeth and located against each other symmetrically with respect to the rotation axis (570C), at least two planet pinion sprockets (580A and 580B) pivotally disposed each on one arm by means of two pivots (581A and 581B) that are respectively disposed at the ends of the two arms, distal from power receiving sprocket. The pivots (581A, 581B) are disposed perpendicular to the longitudinal dimension of the arms (520A, 520B) and radially with respect to the rotation axis (570C), protruding towards each other from the arms thereby rotation of the power receiving sprocket (570) causes rotation of the pivots (581A, 581B) about the rotation axis (520C) like turning radials. The planet pinion sprockets (580A, 580B) are carried by their respective pivots around the rotation axis (520C) and are allowed to turn each about its specific pivot axis which coincides with its respective pivot (581A, 581B).

According to additional embodiments, the differential gearbox further comprises sun gear sprockets (590A, 592A) rotatable about the rotation axis (570C) and engaged and geared with the planet pinion sprockets (580A, 580B), such that, when the power input sprocket turns, its turn causes the planet pinion sprockets to turn with it and to turn the sun gear sprockets about the same axis, and two power output shafts (590, 592) each rotatable by a respective sun gear sprocket.

A racing car complying with the General Competition Rules (GCR) document (that is issued by the Sports Car Club of America Inc. (SCCA)) is disclosed, built and operative according to some embodiments of the present invention. The race car comprises a chassis, a 1000 cc motorcycle power unit positioned on the chassis with its power output shaft parallel to the longitudinal dimension of the chassis and the power unit laterally centralized with respect to the lateral dimension of the chassis, a rear differential gearbox positioned behind the power unit with respect to the travel direction of the racing car; and a power drive shaft connected between the power output shaft of the power unit and a power input shaft of the rear differential gearbox, wherein the angle between the power drive shaft and a medial longitudinal axis of the chassis is no more than 5 degrees.

A method for powering rear wheels of a racing car that complies with the General Competition Rules (GCR) document issued by the Sports Car Club of America Inc. (SCCA) is disclosed, according to some embodiments of the present invention. The method comprises providing a differential gearbox case, providing a power input shaft and providing, inside the differential gearbox case: a pinion sprocket that is connected to and rotatable with the power input shaft, a differential transmission assembly connected to and rotatable with the power receiving sprocket and two output drive shafts that are rotatable by the differential transmission assembly, wherein the output drive shafts are rotatable in different rotation speeds, and maintaining the differential gearbox case stationary with respect to the input shaft when rotational power is provided to the power input shaft.

According to some embodiments, the powering method further comprises attaching one rear wheel to each of the two output drive shafts.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
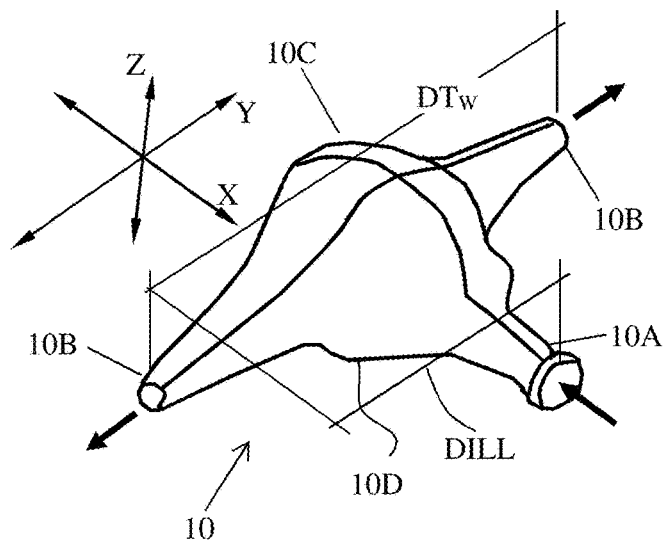
FIG. 1A is a schematic isometric illustration of a differential gearbox, commonly used in vehicles for providing rotational power.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Differential gearboxes are adapted to transfer rotational power that is provided to the gearbox to two output axes in a way that enables the output axes to rotate in mutually different rotational speeds. Generally speaking, there are two kinds of differential gearboxes. A first kind includes a closed, external case in which the entire mechanism of the gearbox is contained. The external case is typically used for supporting the gearbox mechanism as well as for containing the lubricant used for lubricating the gearbox mechanism. In this first kind of differential gearboxes, the external case is stationary, i.e., does not take part in the transmission of the rotational power, and the mechanical power is provided (through the case's wall) to the internal mechanism, typically via a rotational input axis or shaft. The power provided to the gearbox is differentially divided to the wheels via two output axes, one for each wheel. The three axes are provided with sealing means to prevent leakage of lubricant from the external gearbox case and to prevent entry of contaminants to the gearbox case through tiny spaces between the axes and the gearbox case walls. When rotational power is provided to the associated wheels, the internal mechanism transfers the power to the wheels, while the external case is stationary and is not involved in transferring the rotational power to the wheels (except for providing stationary support to the mechanism).

A second kind of differential gearboxes is a kind in which the external case of the gearbox is used to provide rotational power to the gearbox mechanism. Accordingly, when rotational power is provided via this kind of differential gearbox to the associated wheels, the external case of the gearbox rotates and takes part in transferring power to the wheels. Such kind of differential gearboxes may include parallel differential gearboxes, such as T-2 torque sensing traction differential gear box of Zexel Torsen Inc. from Rochester, N.Y. USA, or the like. It will be apparent that, in differential gearboxes of the second type, the need to rotate the external case imposes mechanical static and dynamic loads on the power source of the gearbox, thereby reducing the performance of the vehicle using that kind of gearbox.

Reference is made to FIG. 1A, which is a schematic isometric illustration of a differential gearbox 10, commonly used in vehicles for providing rotational power (e.g., torque) to two wheels allowing them to turn in mutually different rotational speeds. Differential gearbox 10 is of the first differential gearbox kind described above. Differential 10 has a power input sprocket/shaft 10A where rotational power is provided (e.g., by a motor or an engine) and two power output sprockets/shafts 10B, one for each wheel. The sprockets system 10C (not shown in this view) inside the gearbox's case 10D enables the functionality of the differential.

Typically, mainly for historical reasons, differential gearbox 10 is symmetric with respect to the longitudinal axis X of a vehicle acting as a symmetry line. The natural direction into input 10A is parallel to axis X, and the direction of output axes 10B is parallel to axis Y. In most of the known differential gearboxes, the power input 10A lies in the X-Y plane of the power outputs 10B, yet in some known differential gearboxes power input 10A is slightly elevated or lowered with respect to the X-Y plane in which power outputs 10B lie, in order to comply with vehicle design constrains design preferences. However, in all of the known differential gearboxes, the location of the power input 10A with respect to the locations of the power outputs 10B is substantially in the middle. This is expressed by the lengths relations between the distance $DT_W$ measured between the two output ports 10B and the distance DILL (differential input lateral length) of power input 10A from either of the power outputs 10B, along the Y axis, which is: $DILL=DT_W/2$.

Figure 1B:
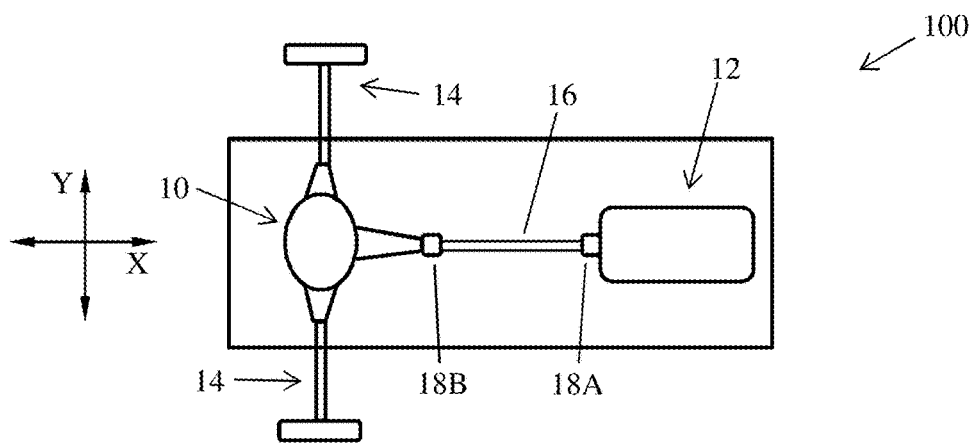
FIG. 1B is a schematic top partial view of a rear portion of vehicle 100, showing its power unit, rear differential gearbox, two rear wheels and axes assemblies and a drive shaft.

Reference is made now to FIG. 1B, which is a schematic top partial view of a rear portion of vehicle 100, showing its power unit 12 (typically an engine and a gearbox), rear differential gearbox 10, two rear wheels and axes assemblies 14 and drive shaft 16 to provide the rotational power from power unit 12 to differential gearbox 10. Typically, the rotational power from power unit 12 is provided via front universal joint 18A and rear universal joint 18B, which allow for certain relative movements between power unit 12 and differential gearbox 10 along the Y axis and the Z axis (perpendicular to the page plane, not shown in the drawing). These relative movements are caused due to the relative freedom of movement given to either of axes assemblies 14 in order to enable flexible and dampened connection of the axes to the vehicle frame/chassis. The common installation of a differential gearbox such as differential gearbox 10 is, thus, in the middle of a vehicle (i.e., along the medial line aligned with the X axis), as shown with respect to vehicle 100, such that its longitudinal axis is aligned and coincident with the longitudinal medial axis X of vehicle 100. This configuration is preferred for a plurality of design and engineering reasons. Uneven lengths of the rear axles may cause transfer of different moments to the respective wheels, which may cause sideways sliding or deviation of the vehicle when instantly providing high moments to the wheels. Maintaining even lengths of the rear axles is profitable, as there is no need to keep two-length stocks of axles. A design of vehicles with rear drive having non-centralized differential gearbox may be due to engineering constrains, such as use of 4×4 gear that provides off-center power output from the power unit, or the like, and not because it is a preferred location for the differential gearbox. For many years, a centralized installation arrangement dictated that the output of power from the power unit, and the input of power to the differential gearbox, would be positioned substantially on or very close to the medial longitudinal axis X.

Figure 1C:
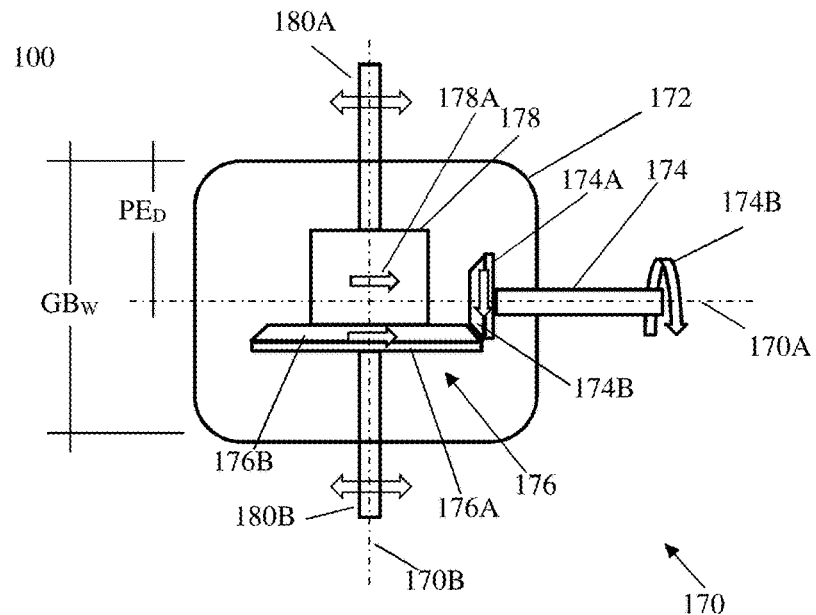
FIG. 1C is a schematic illustration of a differential gearbox.

Reference is made to FIG. 1C, which is a schematic illustration of differential gearbox 170. Gearbox 170 comprises case 172, power input axis 174 that is mechanically engaged or connected to power input sprocket 174A, power receiving sprocket 176 which is rotationally engaged with power input sprocket 174A and mechanically connected to gearbox differential transmission assembly 178 and adapted to rotate with it, and output axes 180A, 180B that are mechanically engaged with gearbox differential transmission assembly 178 and receive rotational power from it in a differential manner. For example, when power input axis 174 rotates in the direction depicted by arrow 174B, power input sprocket 174A rotates in the same direction and causes power receiving sprocket 176 to rotate in the direction depicted by the arrow drawn on it. As a result, gearbox differential transmission assembly 178 rotates with power receiving sprocket 176 in the same direction, thereby providing rotational power to its internal mechanism. Typically, with differential gearboxes, when same mechanical load is imposed on output axes 180A, 180B, these axes will rotate in the same direction and same rotational speed. In case the load imposed on one axis, e.g., output axis 180A, is greater than that imposed on the other output axis, it will slow its rotational speed and thereby cause increase of the rotational speed of the other output axis.

Typically, the way rotational power is transferred from power input sprocket 174A to power receiving sprocket 176 is by means of a conical paired sprockets of one of certain configurations, where both power input sprocket 174A power receiving sprocket 176 are conical matching sprockets, and their transmission ration is determined to meet certain design constrains such as moment, speed, rotational speed etc. Conical sprocket wheels typically include, as depicted with respect to power receiving sprocket 176, sprocket body 176A formed as a flat disk, and on one of its faces sprocket teeth section 176B is formed. As seen in FIG. 1C, the teeth section 176B is formed on the face of power receiving sprocket 176 that faces towards gearbox differential transmission assembly 178.

Imaginary line 170A that is parallel to power input axis 174 and runs in its middle is located transversally in a distance Power Entry Distance $PE_D$ from one of the side walls of the gearbox case 172 and the transversal width is GearBox Width $GB_W$. Typically, the relations between these dimensions maintain $PE_D=0.5\ GB_W$. This means that power entry into gearbox 170 is substantially in the middle of its width dimension. Imaginary line 170B is perpendicular to line 170A and coincides with the turning axes of power receiving sprocket 176 of gearbox differential transmission assembly 178 and of output axes 180A and 180B.

Figure 1D:
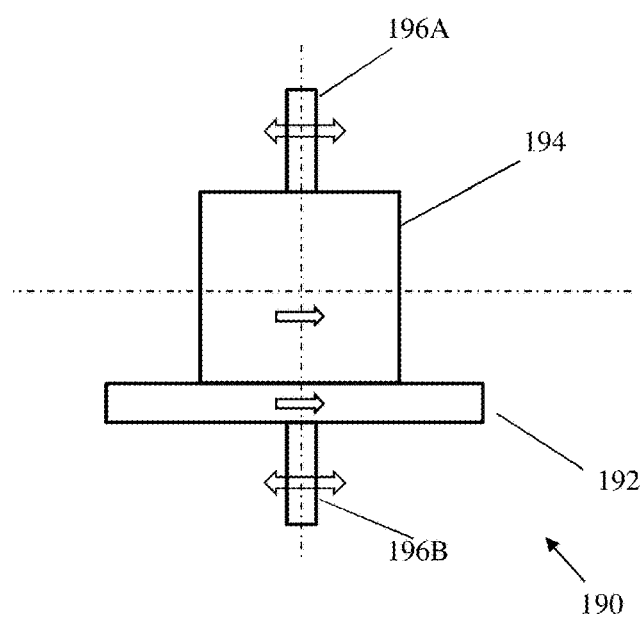
FIG. 1D is a schematic illustration of parallel differential gearbox.

Reference is made to FIG. 1D, which is a schematic illustration of parallel differential gearbox 190. Gearbox 190 depicts a parallel differential gearbox that is installed and operated apart from a power unit. It will be noted that, in certain configurations, parallel gearboxes may be formed as part of an assembly comprising an engine, a gearbox and a differential gearbox in one unified unit. In such configurations, the parallel gearbox may be enclosed in a case comprising also the gearbox and thus is lubricated by the lubrication system of the gearbox and does not need a case for itself. Gearbox 190 depicts a configuration wherein it is located apart from the power unit (engine and gearbox), for example—in the Formula 1000 race cars using power units of a 1000 cc motorcycle. Gearbox 190 comprises power entry wheel 192 which is mechanically connected to gearbox case 194, differential gearbox mechanism (not shown) comprised within gearbox case 194 and powered by it and power output axes 196A and 196B. Rotational power may be delivered to parallel differential gearbox 190 by means of a drive chain, drive belt or similar arrangement.

The functionality of parallel differential gearbox 190 is similar to that of gearbox 170 with respect to the way the input rotational power is delivered to the two output axes while allowing them to rotate mutually in different rotational speeds. However, parallel differential gearbox 190 substantially differs from differential gearbox 170 in that the gearbox case of gearbox 170 does not participate in delivering power from the input to the output axes, while with parallel differential gearbox 190 the gearbox case 194 is part of the power chain through which power is delivered from the input to the output axes. Accordingly, when a parallel differential gearbox is used, at least some power delivered through it is consumed by the need to rotate, slow or accelerate the mass of the gearbox case.

Figures 2A, 2B, 2C:
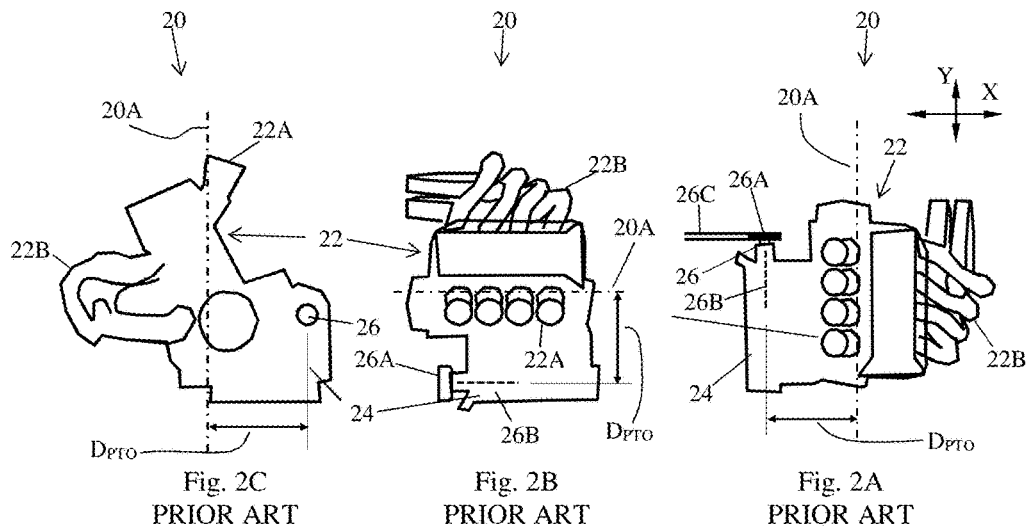
FIGS. 2A-2C are schematic silhouette illustrations of a typical 1000 cc motorcycle engine and a gearbox in top view at a first orientation, in top view in a second orientation and in side view from the side of the power output, respectively.

In the racing cars arena, the design of Formula 1000 category racing car is subject to a large number of design and operation restrictions, constrains and directions. One such restriction is that the engine to be used should be a 1000 cc motorcycle engine. Reference is made to FIGS. 2A, 2B and 2C, which are schematic silhouette illustrations of a typical 1000 cc motorcycle engine and gearbox 20 (herein after EGB 20 or power unit 20) in top view at a first orientation, in top view in a second orientation and in side view from the side of the power output, respectively. EGB 20 comprises engine unit 22, gearbox unit 24 with power output point 26 and schematic indication 26B (dashed line) of the location and orientation of the EGB 20 output shaft. Engine unit 22 comprises air inlet ducts 22A and exhaust outlet piping system 22B.

It should be noted that the specific form (pipe cross section, lengths, curvatures, etc.) of both air inlet ducts 22A and exhaust piping system 22B have large influences on the overall performance of engine 22. For example, if, because of design constraints, the specific form of an air inlet 22A and/or exhaust pipe 22B will be changed, compared to the original form and without careful attention to the impact of wrong redesign of these ducts, the output power of engine 22 may be reduced and even dramatically. For example, if, in order to satisfy design requirements related to reduction of space occupied by the engine, the curvatures of the air inlet and/or gas exhaust ducts will be made sharper, the resistance to air/gas flow will grow bigger and thereby will reduce the available output power from the engine. For this reason the following description will be made considering that the space occupied by EGB 20 may not be substantially modified by modifying the form of either inlet ducts 22A or exhaust pipes 22B. Imaginary line 20A in all three views 2A, 2B and 2C indicates a central line which crosses substantially in the dimensional middle of the respective view and that is believed to cross substantially through the center of gravity (CG) of EGB 20. The distance between line 20A and the axis line of power output shaft 26B is denoted $D_{PTO}$.

As seen in the drawings, the location of the power output point 26 is close to one side of EGB 20, as seen in top view (FIG. 2A), and substantially elevated from the bottom of EGB 20, as seen in side view (FIG. 2C). Referring to reference frame X-Y shown next to FIG. 2A, direction X indicates the front-back directions of a respective vehicle (where front is the direction of the vehicle pointing to the direction of movement when the vehicle moves forward). EGB 20, shown in FIG. 2A, is oriented as it is installed in a motorcycle, shown in top view. Traditionally, the direction of output shaft 26B is perpendicular to the front-back direction (X axis) and aligned with the lateral (Y axis) direction. Typically the mechanical output from output point 26 transfers mechanical rotational power via a sprocket and a chain or a pulley and a drive belt 26C. For many reasons, the EGB is located near the longitudinal center of the motorcycle and the power is transferred backwards to the rear wheel.

All of the known Formula 1000 race cars locate the EGB in substantially the same orientation as in a motorcycle, i.e., with the power output shaft extending sideway perpendicularly to the longitudinal axis of the vehicle, and use a chain/belt to transfer the mechanical output rotational power backwards to the rear axles. The fact that the power is transferred to the rear wheels by means of a chain/belt imposes the need to use a differential gearbox that is adapted to receive the rotational power by means of a chain/belt.

Figure 3A:
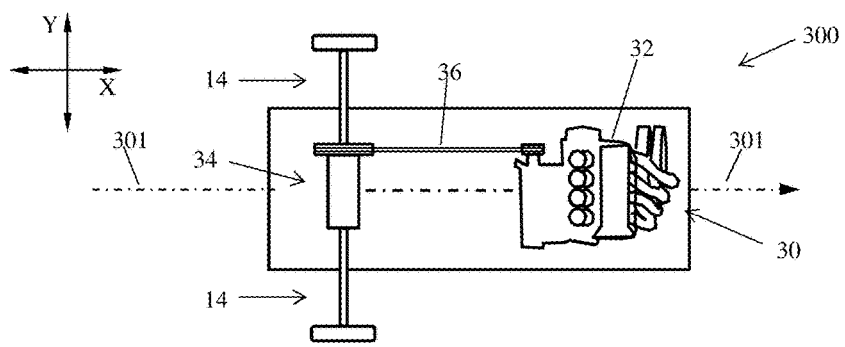
FIG. 3A is a schematic partial top view illustration of a rear portion of a vehicle showing its power unit, rear differential gearbox, two rear wheels and axes assemblies and a drive chain.

Reference is made to FIG. 3A, which is a schematic partial top view illustration of a rear portion of vehicle 300, showing its power unit 32, rear differential gearbox 34, two rear wheels and axes assemblies 14 and drive chain 36. The way power is delivered from power unit 32 to the rear wheels assemblies 14 shown in FIG. 3 is the arrangement commonly used in Formula 1000 race cars. Since the orientation of the power output shaft of power unit 32 is directed to the side, perpendicular to the longitudinal axis 301 of vehicle 300, in order to transfer power to the rear wheels via a differential gearbox, such as gearbox 34, this gearbox needs to be of the parallel differential gearbox type that is adapted to be powered via a sprocket or a belt-driven V-type wheel, such as T-2 torque sensing traction differential gear box of Zexel Torsen Inc. from Rochester, N.Y. USA, or the like. In this type of differential gearboxes, the rotational power is delivered to the gearbox by means of rotating the gearbox external case when power is delivered to the gearbox, as opposed to a standard rear axle car differential gearbox, such as gearbox 10 of FIG. 1B, wherein the external case remains stationary when power is delivered to the differential gearbox.

Figure 3B:
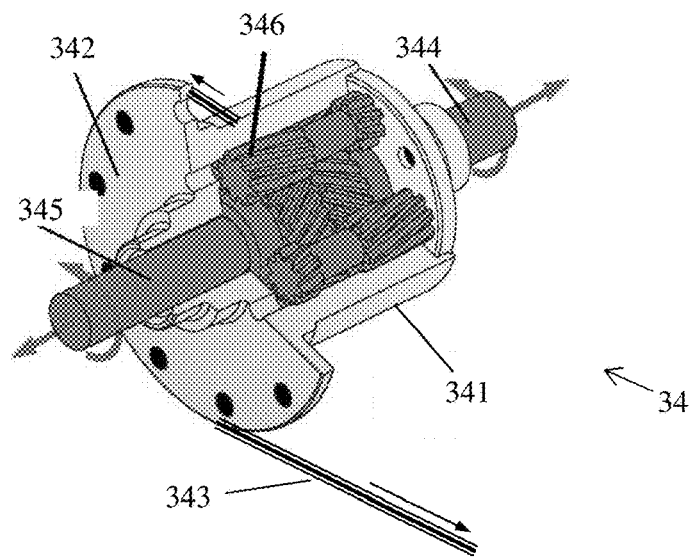
FIG. 3B schematically presents a partial sectional isometric view of parallel differential gearbox as known in the art.

Reference is made now to FIG. 3B which schematically presents a partial sectional isometric view of parallel differential gearbox 34, as known in the art. Parallel differential gearbox 34 is powered via driving chain or belt 343 that drives an input sprocket/V-type drive wheel 342. Wheel 342 may be part of differential case 341 or may firmly be attached to it. When wheel 342 is rotationally driven, case 341 rotates with it and consequently delivers the rotational power to the gearbox internal mechanism 346, which in turn causes output axles 344 and 345 to rotate with the gearbox, while enabling differential rotation between these axels.

Following an analysis of the operation of a parallel gearbox, such as gearbox 34, it may be concluded that case 341 of gearbox 34 practically operates as the input shaft of the gear, while wheel 342 functions as the power input sprocket/wheel. Accordingly, the use of such parallel differential gearbox involves driving/rotating the whole mass of the gearbox, as opposed to the use of a common aft differential gearbox such as differential gearbox 10 of FIG. 1B, wherein the external case of the gearbox remains stationary. This imposes the need to rotate undesirable extra mass which consumes power and imposes acceleration and deceleration loads—highly negative effects especially when race car is involved where there is a strive to provide as much power as possible and to deliver this power as fast as possible to the wheels while reducing the inertial negative effects to minimum. Furthermore, the use of a drive chain (the use of a drive belt in race cars is not common due to the limited deliverable power or, if high power needs to be delivered, the belt's dimensions will become an issue) imposes further additional mass that needs to be driven with its associated negative inertial effects, along with negative routine (typically daily) maintenance burden.

As presented above, there are severe disadvantages involved in using parallel differential gearbox that are installed apart from and relatively away from the power unit, yet it provides available means for receiving rotational power from a power unit that outputs its rotational power via an output power axis that is oriented perpendicular to the longitudinal axis of a vehicle, as is the case in common known design of formula 1000 race cars. There is an ongoing and long lasting need to enable provision of rotational power from a power unit acceptable in the Formula 1000 category that reduces or completely eliminates the power losses and excessive inertia problems associated with the use of parallel differential gearbox. Another expected advantage stemming from a 90-degrees rotated installation of the power unit is the removal away of the exhaust piping system from the back of the driver's seat, which may enable improved engine cooling performance for the power unit, and positioning the engine closer to the driver and farther from the rear axle, for better mass centralization and heat evacuation as well as other advantages. With chain driven configurations, there is a design tendency to keep the distance of the output shaft from the engine to the rear axle as short as possible in order to maintain the chain's length as short as possible so as to reduce chain's mass and inertial issues. However, with chain-driven configurations having sprockets with different diameters (which is the usual case), the distance between the two sprockets may not be too short in order to ensure minimal acceptable embraced sector of the smaller sprocket. With drive shaft configurations, this distance may be bigger with very limited negative impact, and consequently it is possible to position the engine close to the driver and farther from the rear axle.

Figure 4:
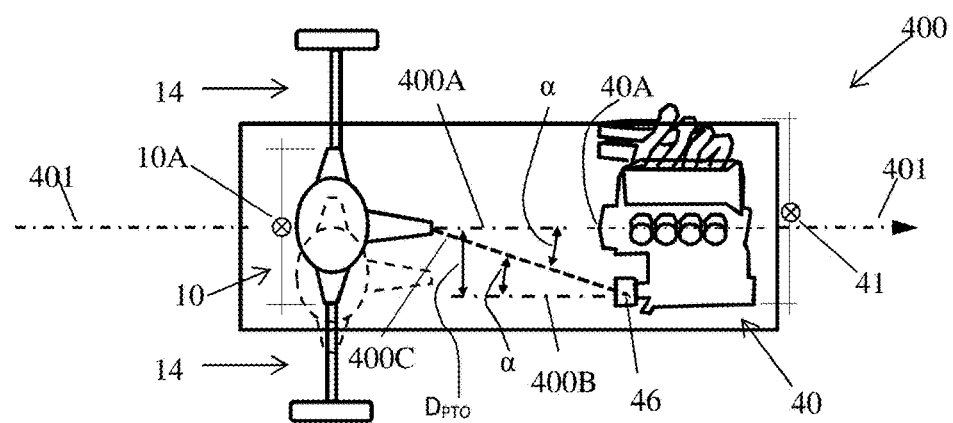
FIG. 4 schematically depicts the relative location and orientation of a power unit and a differential gearbox in schematic partial view of a vehicle.

Attempts to locate a Formula 1000 power unit with a 90 degrees rotated orientation, so that its output power axis will be parallel to the longitudinal axis of the vehicle and will point backwardly towards the rear wheels and their differential gearbox raised other structural obstacles that eventually prevented the use of a car's standard differential gearbox (such as gearbox 10 of FIG. 1B). Reference is made to FIG. 4, which schematically depicts the relative location and orientation of power unit 40 and differential gearbox 10 in schematic partial view of vehicle 400. Power unit 40 is substantially identical to power unit 20 of FIGS. 2A-2C and to power unit 30 of FIG. 3A, but, in the structure depicted in FIG. 4, power unit 40 is located rotated by 90 degrees with respect to the orientation depicted in FIG. 2A or 3A, in order to direct its power output axis 46 backwardly and parallel to the longitudinal center line 401 of vehicle 400. Position 41 indicates the location of the lateral center of the lateral dimension of power unit 40. Under common engineering considerations, power unit is located laterally substantially in the lateral center of vehicle 400, in order to centralize its CG (e.g., for better dynamic stability) and its external contour with the lateral dimension of vehicle 400. Similarly, differential gearbox 10 is positioned so that its lateral center, indicated by point 10A, is located substantially in the middle of the lateral dimension of vehicle 400. Line 400A indicates the location of power input shaft of differential gearbox 10. Line 400B indicates the location of power output shaft of power unit 40. Both lines are substantially parallel to each other and to longitudinal central line 401 of vehicle 400. Since central line 40A of power unit 40 is substantially centered with vehicle 400 lateral dimension and so is differential gearbox 10, the lateral deviation of rotational power output 46 from the power input axis of gearbox 10 is $D_{PTO}$. This dimension is typically 100-150 mm at least. Apparently, connecting the power output shaft 46 of power unit 40 to the power input shaft of differential gearbox 10 (as depicted by line 400C) will create a deviation angle α from the straight connection and will require use of special, high deviation angle joints at both ends of the drive shaft if it is designed along line 400C. The value of α may amount to 25-30 degrees and more in an exemplary F1000 race car design where the differential is located 240 mm rearward of the engine. Such high deviation angle imposes too high mechanical losses in the drive shaft joints along with fast mechanical wear. A good design of a race car should minimize the undesired losses as much as possible, and especially in view of the inherent power limitation of the Formula 1000 category, which dictates strict limit on the power available from the power unit.

In order to enable use of a differential gearbox such as gearbox 10 (which is a gearbox with stationary case), and further to minimize the deviation angle of the drive shaft, it may be considered to de-centralize differential gearbox 10 by moving it to the left of the longitudinal central line 401 (as depicted by a dashed-line schematic illustration of gearbox 10). However, such solution is not recommended according to considerations of dynamic stability and performance of the rear wheels, which will be negatively affected.

Figure 5A:
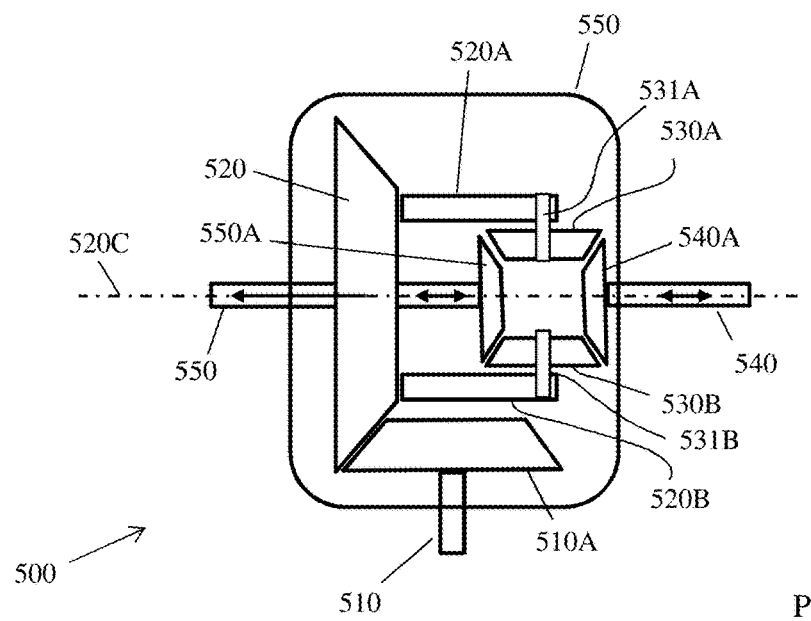
FIG. 5A is a schematic illustration of a differential gearbox with a stationary case, as is known in the art.

Reference is made now to FIG. 5A, which is a schematic illustration of differential gearbox 500 with a stationary case as is known in the art. Differential gearbox 500 has a case 550 enclosing, pivotally supporting and providing lubrication means to all of the rotating parts of the gearbox. Power is delivered to gearbox 500 via power input shaft 510 which is installed at its internal end power input sprocket 510A. Pinion Sprocket 510A is engaged with and is adapted to provide rotational power to crown sprocket 520. Sprockets 510A and 520 are helical conical sprockets thereby enabling change of 90° of the direction of the rotational power. Assuming that the direction of the rotational power is defined as the line parallel to and coinciding with the shaft of the powering/powered sprocket, and the direction of the line indicates the direction of rotation (CW/CCW), an arrow drawn on the respective shaft may be used to define the respective rotational power (direction of operation and direction of rotation). Rotation of power input sprocket 510A causes the rotation of pinion sprocket 520 respectively. Arms 520A and 520B are connected firmly to the face of sprocket 520 facing into case 550 and extending perpendicularly from this face, adapted to turn with sprocket 520 about axis 520C. At the distal end of each of arms 520A and 520B, planet pinion sprockets 530A and 530B are pivotally disposed on pivots 531A and 531B, respectively. Pivots 531A and 531B are disposed perpendicular to the longitudinal dimension of arms 520A and 520B, respectively and radially with respect to axis line 520C, protruding towards each other from arms 520A, 520B, respectively. Thereby, rotation of pinion sprocket 520 causes the rotation of pivots 531A and 531B about axis line 520C as turning radiuses. As a result, planet pinion sprockets 530A and 530B are carried by their respective pivots around axis line 520C adapted to turn about their specific pivot axes which coincide with pivots 531A, 531B, respectively. It will be noted that the differential gearbox described above is a basic gearbox, adapted to divide power delivered to the gearbox between two output axes in a manner that allows the output axes to rotate in mutually different rotational speeds. Other types of differential gearboxes may comprise additional elements and may provide additional functionalities such as limited slip differential gearbox or differential gearboxes with viscous limit slip that act with friction plates. The inventive aspects described herein are not limited to the simple differential gearbox described above and may just as well be used with other types of differential gearboxes having stationary cases.

Power output axes 540 and 550 are pivotally supported by gearbox case 550 and are made to rotate about axis line 520C, as is pinion sprocket 520. Output axes 540 and 550 have disposed on and firmly attached to their ends residing inside gearbox case 550 sun gear sprockets 540A, 550A respectively, adapted to rotate with axes 540, 550. Sun gear sprockets 540A, 550A are engaged and geared with planet pinion sprockets 530A and 530B so that, when equal mechanical load is exerted onto output axes 540 and 550, the rotation of pinion sprocket 520 with planet pinion sprockets 530A and 530B about axis 520C causes the rotation of output axes 540 and 550 in the same rotation direction as pinion sprocket 520. When different mechanical loads are exerted onto output axes 540 and 550, the engagement of axes 540 and 550 to each-other via planet pinion sprockets 530A and 530B enable them to be rotated about axis line 520C in rotation speeds that are different from each other and different from the rotation speed of pinion sprocket 520. Actually, when the mechanical loads exerted to axes 540, 550 are different from each other, for example the mechanical loads ML maintain the relation $ML_{540} > ML_{550}$ the rotational speeds RSs maintain $RS_{540} < RS_{520} < RS_{550}$, and when $ML550=0$, the following relation of rotational speeds exist: $RS_{540}=0$ and $RS_{550}=2 \times RS_{520}$.

The strive for improved mechanical efficiency leads the inventors of the below described embodiments to seek for solutions that will enable use of a non-parallel differential gearbox, at least because of the disadvantages listed above. In order to enable efficient use of a differential gearbox with stationary case without locating the 1000 cc power unit or the differential gearbox off-center, the inventors have invented a modified differential gearbox with off-center power input as described in details herein below.

Figure 5B:
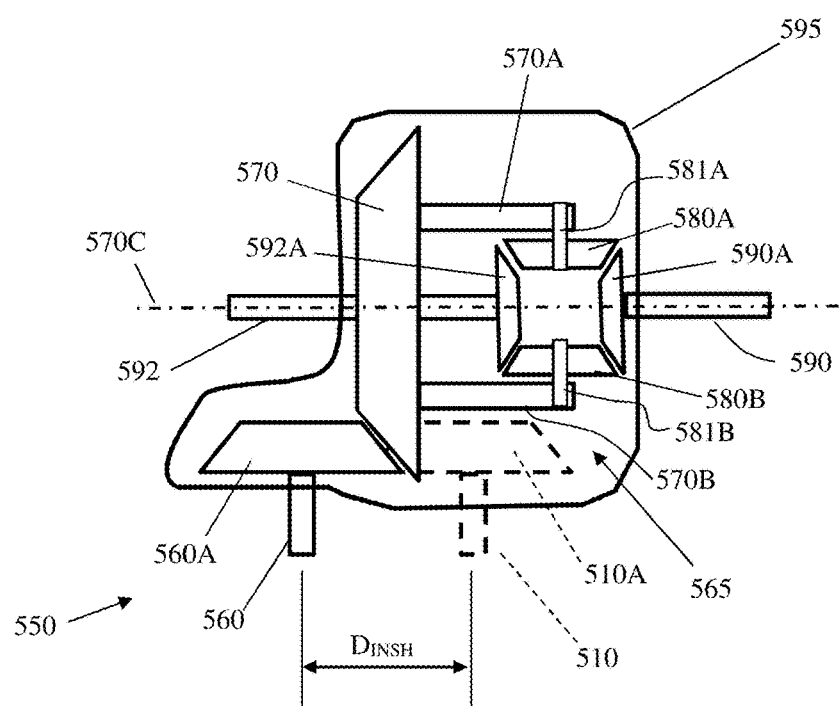
FIG. 5B is a schematic illustration of modified, stationary case differential gearbox according to embodiments of the present invention.

Reference is made now to FIG. 5B which is a schematic illustration of a modified, stationary case differential gearbox 550, according to some embodiments of the present invention. Modified differential gearbox 550 comprises case 595, power input shaft 560 with power input sprocket 560A which are pivotally supported by case 595. Power input sprocket 560A is adapted to engage with and provide rotational drive to pinion sprocket 570, similar to the way power input sprocket 510A drives pinion sprocket 520 in differential gearbox 500 of FIG. 5A, with a substantial difference—pinion sprocket 570 is positioned in differential gearbox 550 with its teeth facing away from the differential internal mechanism comprising pinion sprockets 580A, 580B and sun gear sprockets 591A, 592A, as distinguished from the orientation of the toothed face of pinion sprocket 520 which is facing pinion sprockets 530A, 530B and sun gear sprockets 530A, 530B. The reversal of the direction to which the toothed face of pinion sprocket 570 is directed, outwardly, enables movement of the location of power input shaft 560 off center by $D_{INSH}$ with respect to the location of power input shaft 510 (see FIG. 5A). The off-center shift $D_{INSH}$ in the location of the power input shaft equals approximately to the mid-diameter of conical power input sprocket 560A, which may be in the range of 60-70 mm Additional improvement in this respect (i.e., reduction of the off-center angle—angle β of FIG. 6) may be obtained by extending the length of arms 570A, thereby enabling sprocket wheel 570 to be positioned farther off-center. The modification to a known static case differential gearbox according to some embodiments of the present invention, as described above, enables the long-desired use of a static-case differential gearbox without having to use a high-deviation-angle drive shaft and/or without having to de-centralize the location of either of the power unit and of the differential gearbox with respect to the median longitudinal line of a race car.

Figure 6:
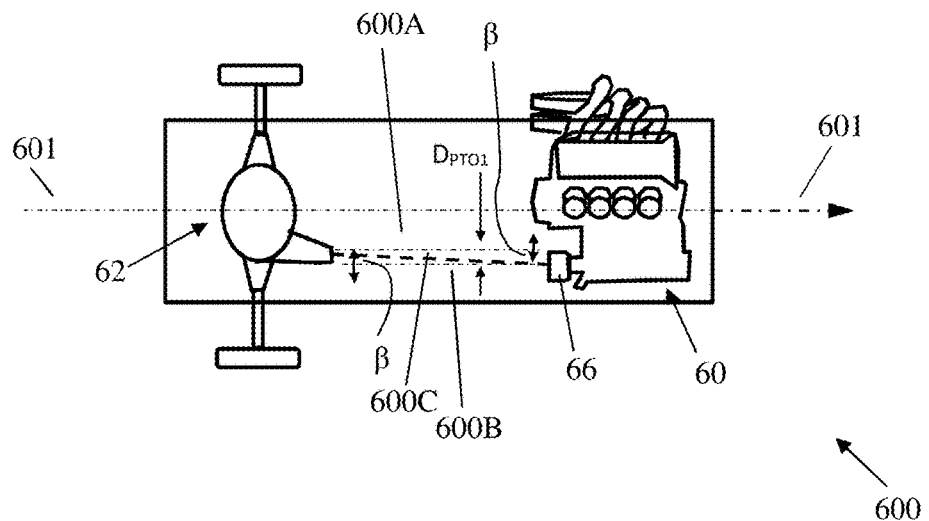
FIG. 6 which schematically depicts the relative location and orientation of a power unit and a modified differential gearbox in schematic partial view of a vehicle, according to embodiments of the present invention.

Reference is made to FIG. 6, which schematically depicts the relative location and orientation of power unit 60 and modified differential gearbox 62 in schematic partial view of vehicle 600, according to some embodiments of the present invention. Power unit 60 is substantially identical to power unit 40 of FIG. 4 with its power output axis 66 directed backwardly and parallel to the longitudinal center line 601 of vehicle 600. Power unit 60 is located with its center of the lateral dimension substantially in the lateral center of vehicle 600. Similarly, modified differential gearbox 62 is located so that its lateral center is located substantially in the middle of the lateral dimension of vehicle 600. Line 600A indicates the location of power input shaft of modified differential gearbox 62. Line 600B indicates the location of power output shaft of power unit 60. Both lines are substantially parallel to each other and to longitudinal central line 601 of vehicle 600. Due to the modification made to modified differential gearbox 62, as described above, the lateral deviation of rotational power output 66 from the power input axis of modified gearbox 62 is $D_{PTO1}$ which is substantially smaller than $D_{PTO}$ of FIG. 4. This dimension is typically 10-15 mm. Consequently, connecting the power output shaft 66 of power unit 60 to the power input shaft of modified differential gearbox 62 (as depicted by line 600C) will create a deviation angle β from the straight connection, which is in the range of 3-5 degrees and, as a result, will enable use of regular joints at both ends of the drive shaft designed along line 400C compared with the joints needed in an embodiment described in FIG. 4 which causes less friction, thereby enabling provision of additional power (less loss of power in the joints). Additionally, the reduced deviation angle β enables reduction of the costs of the joints.

Figure 7A:
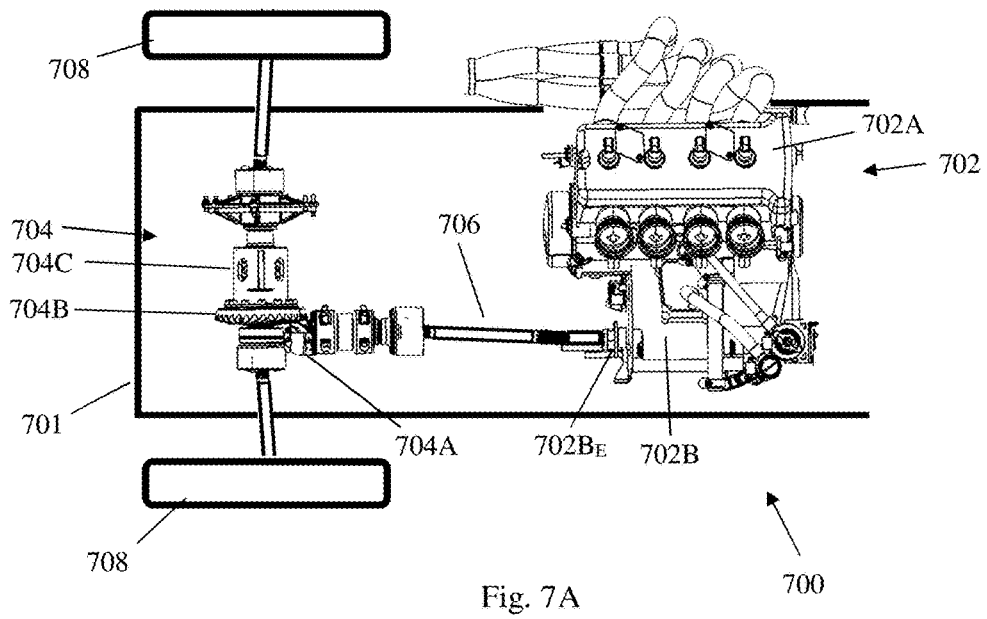
FIGS. 7A and 7B are schematic partial illustrations of a combinations of a power unit and a modified differential gearbox in top view and side view, respectively, according to embodiments of the present invention.
Figure 7B:
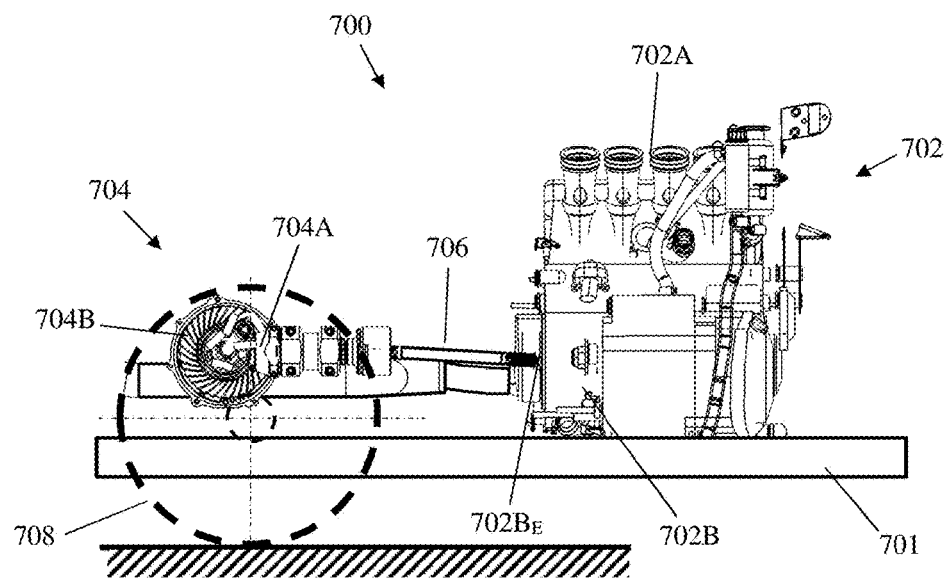

Reference is made now to FIGS. 7A and 7B, which are schematic partial illustrations of combinations 700 of power unit 702 and modified differential gearbox 704 in top view and side view, respectively, according to some embodiments of the present invention. Power unit 702 may be connected via drive shaft 706 to modified differential gear 704 which is adapted to provide rotational power to rear left and right wheels 708, installed on chassis 701. Power unit 702 may be, in accordance with some embodiments of the present invention, engine and gearbox GSX-R1000 of Suzuki or CBR1000RR of Honda. The power output from power unit 702 is $702B_E$. Rotational power transferred to drive shaft 706 is provided via input sprocket 704A to modified power sprocket 704B and from it via the differential mechanism 704C to rear wheels 708 in a differentially manner.

As seen in FIG. 7A the angular deviation of drive shaft 706 from a longitudinal front-rear line of cassis 701 in the horizontal plane of FIG. 7A is very small, as discussed above with respect to FIG. 6, due to the large off-center movement of the power input point into modified differential gearbox 704. This enables use of a drive shaft with joints adapted to small deviation angles thereby allowing transfer of more power, with less loss and less wear of the drive shaft joints.

As is clearly seen in FIG. 7B, the deviation angle of drive shaft 706, in the vertical plane of FIG. 6B is also small, and it may be much more easily controlled by adjustment of the height of power unit 702 with respect to chassis 701 and/or modified differential gearbox 704. Additionally, as is known in the art, the type of the gear design of the input into modified differential gearbox 704 may be selected so as to meet certain design requirements. The selected type of the input gear may dictate the height of the power input point into modified differential gearbox 704, e.g., lower than the middle height of the gearbox, in line with the middle height of the gearbox or higher than that line. It will be noted that, even with extreme deviation of the height of the power input point to gearbox 704, i.e., lower or higher than the middle point by almost half the height of the gearbox, the angle of deviation of drive shaft 706 from a horizontal reference line remains relatively small, and thereby does not impose negative constrains. Locating the input shaft of the differential gearbox lower than the output axis is used, for example, in a "Hypoid" crown-pinion system. Hypoid configuration may have certain advantages over a Bevel system (where the input shaft and output axes are at the same height) in regard to noise and torque at low rotational speeds, but for our use in a Formula 1000 race car, bevel is preferred. In an exemplary configuration, according to some embodiments of the present invention, drive shaft 706 may be elevated at its rear end by 3.5 degrees with respect to its front end.

Figure 8:
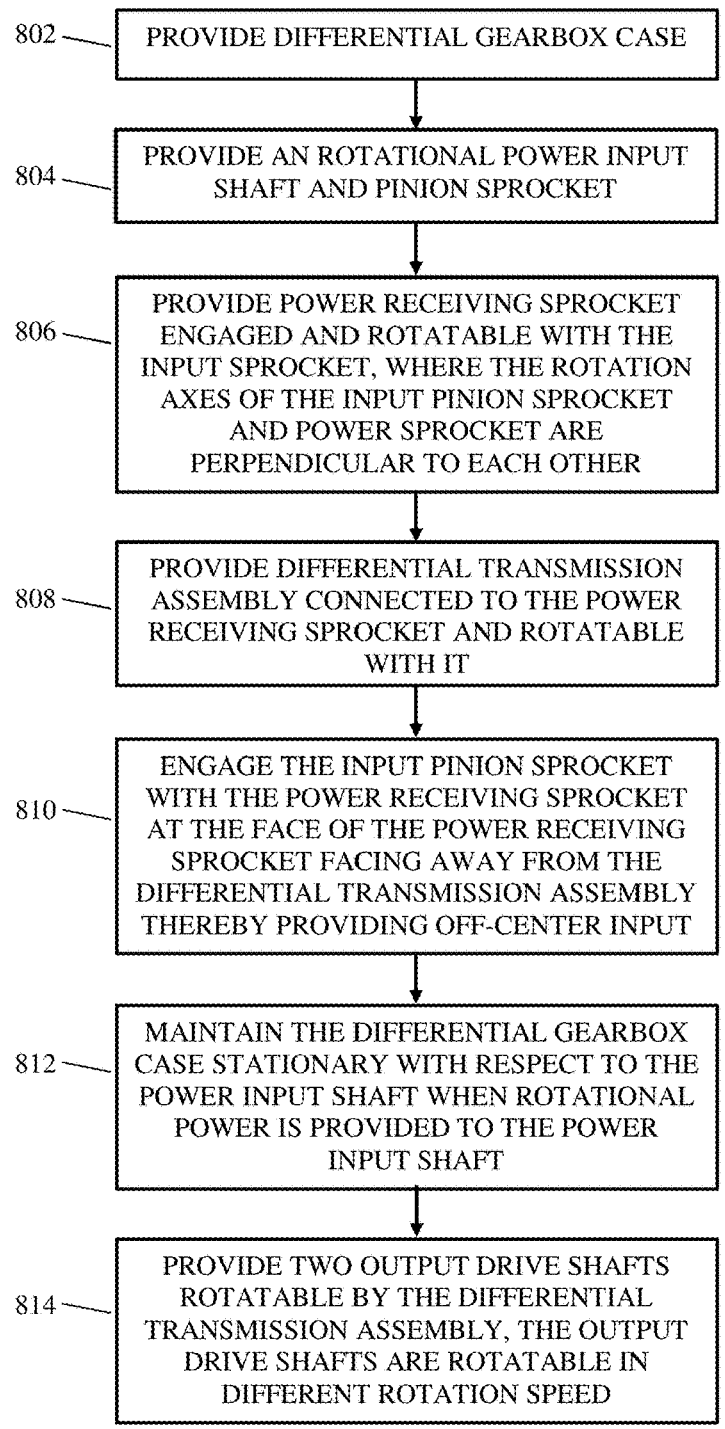
FIG. 8 depicts a method for providing a differential gearbox according to embodiments of the present invention.

A method for providing a differential gearbox according to some embodiments of the present invention is depicted in a flow diagram of FIG. 8. A differential gearbox case is provided (block 802), and a power input shaft with a pinion sprocket are provided (block 804), wherein the pinion is located inside the gearbox case. Inside the case, a power receiving sprocket is provided engagable and rotatable with the power input sprocket (block 806). A differential transmission assembly is provided connected to and rotatable with the power receiving sprocket, inside the case (block 808). The power input pinion is located so as to engage the power receiving sprocket at is face facing away from the differential transmission assembly (block 810). The differential gearbox case is maintained stationary with respect to the input shaft when rotational power is provided to the power input shaft (block 812). Two output drive shafts are rotatable by the differential transmission assembly the output drive shafts are rotatable in different rotation speed (block 814). Optionally, rear wheels may be connected each to one output drive shaft.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A racing car, the race car comprising:
 a chassis;
 a 1000 cubic centimeters (cc) motorcycle power unit comprising motorcycle engine and gearbox, positioned on the chassis with its power output shaft parallel to the longitudinal dimension of the chassis, wherein the center of gravity (CG) of the power unit is substantially laterally centralized with respect to the lateral dimension of the chassis; a rear differential gearbox positioned behind the power unit with respect to the travel direction of the racing car; and
 a power drive shaft connected between the power output shaft of the power unit and a power input shaft of the rear differential gearbox,
 wherein the rear differential gearbox comprises a pinion sprocket that engages a power receiving sprocket at the side of the power receiving sprocket facing away from a gearbox differential transmission assembly of the rear differential gearbox; and
 wherein the angle between the power drive shaft and a medial longitudinal axis of the chassis is no more than 5 degrees.

2. The racing car of claim 1, wherein in the rear differential gearbox the teeth of the power receiving sprocket are engraved on the face of the power receiving sprocket facing away from the gearbox differential transmission assembly.

3. The racing car of claim 1, wherein the rear differential gearbox further comprises:
 at least two arms perpendicularly connected to the face of power receiving sprocket facing away from its engraved teeth and located against each other symmetrically with respect to the rotation axis;
 at least two planet pinion sprockets that are pivotally disposed each on one of the at least two arms by means of pivots, respectively at the end of the at least two arms distal from power receiving sprocket, wherein the pivots are disposed perpendicular to the longitudinal dimension of the arms (520A, 520B), respectively, and radially with respect to the rotation axis, protruding towards each other from the arms respectively, whereby rotation of the power receiving sprocket causes the rotation of pivots about the rotation axis like turning radials, and
 wherein the planet pinion sprockets are carried by their respective pivots around the rotation axis and allowed to turn each about its specific pivot axis which coincides with its respective pivot.

4. The racing car of claim 3, wherein the rear differential gearbox further comprises:
 sun gear sprockets rotatable about the rotation axis and are engaged and geared with the planet pinion sprockets such that, when the power input sprocket turns, its turn causes the planet pinion sprockets to turn with it and to turn the sun gear sprockets about the same rotation axis; and
 two power output shafts each rotatable by a respective sun gear sprocket.

5. The racing car of claim 4, further comprising at least one rear wheel connected to a respective power output shaft.

6. A method for powering rear wheels of a racing car, comprising:
 providing a 1000 cubic centimeters (cc) motorcycle power unit comprising motorcycle engine and gearbox, positioned on the chassis with its power output shaft parallel to the longitudinal dimension of the chassis, wherein the center of gravity (CG) of the power unit is substantially laterally centralized with respect to the lateral dimension of the chassis;
 providing a differential gearbox positioned on the chassis such that the center of gravity (CG) of the power unit is substantially laterally centralized with respect to the lateral dimension of the chassis, the differential gearbox comprising;
  a differential gearbox case;
  a power input shaft; and
  a pinion sprocket, the pinion sprocket is connected to and rotatable with the power input shaft;
  a power input sprocket, engaged with and rotatable by the pinion sprocket;
  a differential transmission assembly connected to and rotatable with the power receiving sprocket; and
  two output drive shafts, rotatable by the differential transmission assembly, wherein the output drive shafts are rotatable in different rotation speeds,
providing a drive shaft connected between the gearbox and the power input shaft of the differential gearbox; and
maintaining the differential gearbox case stationary with respect to the input shaft when rotational power is provided to the power input shaft via the drive shaft.

\* \* \* \* \*